United States Patent
Han et al.

(10) Patent No.: US 9,276,290 B2
(45) Date of Patent: Mar. 1, 2016

(54) ELECTROLYTE FOR RECHARGEABLE LITHIUM BATTERY AND RECHARGEABLE LITHIUM BATTERY COMPRISING SAME

(75) Inventors: Sang-Il Han, Yongin-si (KR); Woo-Cheol Shin, Yongin-si (KR); Jung-Yi Yu, Yongin-si (KR); Tae-Hyun Bae, Yongin-si (KR); Mi-Hyun Lee, Yongin-si (KR); Denis Chernyshov, Yongin-si (KR); Alexey Tereshchenko, Yongin-si (KR); Pavel Shatunov, Yongin-si (KR); Boris A. Trofimov, Irkutsk (RU); Nina K. Gusarova, Irkutsk (RU)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 1090 days.

(21) Appl. No.: 13/299,272

(22) Filed: Nov. 17, 2011

(65) Prior Publication Data

US 2012/0244445 A1 Sep. 27, 2012

(30) Foreign Application Priority Data

Mar. 24, 2011 (KR) ........................ 10-2011-0026577

(51) Int. Cl.
| | |
|---|---|
| H01M 10/0567 | (2010.01) |
| H01M 4/505 | (2010.01) |
| H01M 4/52 | (2010.01) |
| H01M 4/485 | (2010.01) |
| H01M 4/525 | (2010.01) |
| H01M 4/58 | (2010.01) |
| H01M 10/052 | (2010.01) |
| H01M 10/0568 | (2010.01) |
| H01M 10/0569 | (2010.01) |

(52) U.S. Cl.
CPC .......... *H01M 10/0567* (2013.01); *H01M 4/485* (2013.01); *H01M 4/505* (2013.01); *H01M 4/52* (2013.01); *H01M 4/525* (2013.01); *H01M 4/58* (2013.01); *H01M 10/052* (2013.01); *H01M 10/0568* (2013.01); *H01M 10/0569* (2013.01); *Y02E 60/122* (2013.01)

(58) Field of Classification Search
CPC ............... H01M 10/0567; H01M 10/0568; H01M 10/0569; H01M 10/052; H01M 6/168; H01M 6/166; H01M 6/164; H01M 4/505; H01M 4/52; H01M 4/485; H01M 4/525; H01M 4/58; Y02E 60/122

See application file for complete search history.

(56) References Cited

U.S. PATENT DOCUMENTS

| | | | |
|---|---|---|---|
| 4,221,874 A | 9/1980 | Moedritzer | |
| 5,830,600 A | 11/1998 | Narang et al. | |
| 6,087,423 A | 7/2000 | Kleiner et al. | |
| 8,062,796 B2 | 11/2011 | Yoon et al. | |
| 2006/0024587 A1 | 2/2006 | Tamura et al. | |
| 2007/0048622 A1* | 3/2007 | Yoon et al. | ..................... 429/326 |

FOREIGN PATENT DOCUMENTS

| | | |
|---|---|---|
| JP | 2003-229173 A | 8/2003 |
| JP | 2004-055253 A | 2/2004 |
| JP | 2008-140171 A | 6/2008 |
| KR | 10-1997-0065547 A | 10/1997 |
| KR | 10-2000-0015946 A | 3/2000 |
| KR | 10-0803193 B1 | 2/2008 |

OTHER PUBLICATIONS

Korean Notice of Allowance dated Aug. 28, 2013 for Korean Patent Application No. KR 10-2011-0026577 which corresponds to captioned U.S. Appl. No. 13/299,272.

Korean Office Action dated Jan. 30, 2013 for Korean Patent Application No. KR 10-2011-0026577 which corresponds to captioned U.S. Appl. No. 13/299,272.

* cited by examiner

*Primary Examiner* — Laura Weiner
(74) *Attorney, Agent, or Firm* — Knobbe Martens Olson & Bear LLP (57) ABSTRACT

In one aspect, a rechargeable lithium battery comprising a non-aqueous electrolyte including an organic solvent; a lithium salt and a substituted 2-fluoroalkoxy-1,3,2-dioxaphospholane 2-oxide is provided. The 2-fluoroalkoxy-1,3,2-dioxaphospholane 2-oxide can be a compound represented by the following Chemical Formula 1.

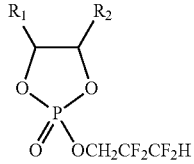

[Chemical Formula 1]

18 Claims, 7 Drawing Sheets

ELECTROLYTE FOR RECHARGEABLE LITHIUM BATTERY AND RECHARGEABLE LITHIUM BATTERY COMPRISING SAME

CROSS-REFERENCE TO RELATED APPLICATIONS

This application claims priority to and the benefit of Korean Patent Application No. 10-2011-0026577 filed on Mar. 24, 2011 in the Korean Intellectual Property Office, the disclosure of which is incorporated herein in its entirety by reference.

BACKGROUND

1. Field

This disclosure relates to an electrolyte for a rechargeable lithium battery and a rechargeable lithium battery including the same.

2. Description of the Related Technology

Lithium rechargeable batteries using an organic electrolyte solution have twice or more the discharge voltage than a conventional battery using an alkali aqueous solution, and accordingly have high energy density.

Composite oxides such as $LiCoO_2$, $LiMn_2O_4$, $LiNiO_2$, $LiNi_{1-x}Co_xO_2$ ($0<x<1$), $LiMnO_2$, and the like have been studied as positive active materials for rechargeable lithium batteries. The negative active materials of rechargeable lithium batteries have been made of various carbon-based materials such as artificial and natural graphite, hard carbon, which can all intercalate and deintercalate lithium ions.

One or more lithium salts dissolved in a carbonate-based solvent has been generally used as an electrolyte for rechargeable lithium batteries. Recently, in order to improve flame retardancy of an electrolyte solution, an addition of phosphoric acid-based retardant to a mixture of cyclic and linear carbonate solvents has been suggested.

However, the phosphoric acid-based retardant causes severe reductive decomposition in an interface between a negative electrode and the electrolyte solution to decrease available capacity of the negative electrode and increase cell resistance. Thereby, it suppresses a smooth intercalation reaction of lithium ions.

Furthermore, if the phosphoric acid-based retardant is added in an excessive amount in a solvent level instead of in an additive level, the cycle-life characteristics of a battery produced therewith is significantly decreased.

SUMMARY

One embodiment of this disclosure provides an electrolyte for a rechargeable lithium battery that has improved flame retardancy.

Another embodiment of this disclosure provides a rechargeable lithium battery including the electrolyte.

According to one embodiment of this disclosure, a non-aqueous electrolyte for a rechargeable lithium battery includes an organic solvent; a lithium salt; and a compound represented by Chemical Formula 1.

[Chemical Formula 1]

In some embodiments, of the Chemical Formula 1, $R_1$ and $R_2$ are each independently hydrogen, $C_1$ to $C_5$ alkyl group, or a $C_1$ to $C_5$ alkyl group substituted with one or more fluorines, provided that at least one of $R_1$ and $R_2$ is not hydrogen.

In some embodiments, the non-aqueous electrolyte may include 0.1 to 10 wt % of the compound represented by Chemical Formula 1.

In some embodiments, the organic solvent may include a carbonate, ester, ether, ketone, alcohol-moiety or an aprotic solvent.

In some embodiments, the lithium salt may include at least one of $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium salt can be lithium bis(oxalate) borate, LiBOB), or a combination thereof. In some embodiments, the lithium salt may be $LiPF_6$.

In some embodiments, the lithium salt may be used at a concentration ranging from about 0.1 M to about 2.0 M. In some embodiments, the lithium salt may be used at a concentration ranging from about 0.5 M to about 1.5 M.

According to another embodiment of the present disclosure, a rechargeable lithium battery is provided that includes a negative electrode including a negative active material selected from a material that reversibly intercalates/deintercalates lithium ions, a lithium metal, a lithium metal alloy, a material being capable of doping and dedoping lithium, or a transition metal oxide; a positive electrode including a positive active material that reversibly intercalates/deintercalates lithium ions; and the non-aqueous electrolyte.

In some embodiments, the positive active material may be selected from the group consisting of $Li_aA_{1-b}R_bL_2$ ($0.90 \leq a \leq 1.8$ and $0 \leq b \leq 0.5$); $Li_aE_{1-b}R_bO_{2-c}L_c$ ($0.90 \leq a \leq 1.8$, $0 \leq b \leq 0.5$ and $0 \leq c \leq 0.05$); $Li_aE_{2-b}R_bO_{4-c}L_c$ ($0.90 \leq a \leq 1.8$, $0 \leq b \leq 0.5$, $0 \leq c \leq 0.05$); $Li_aNi_{1-b-c}Co_bR_cL_\alpha$ ($0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ ($0.90 \leq a \leq 1.8$, $0 \leq b \leq 0.5$, $0 \leq c \leq 0.05$ and $0 \leq \alpha \leq 2$); $Li_aNi_{1-b-c}Mn_bR_cL_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_bE_cG_dO_2$ ($0.90 \leq a \leq 1.8$, $0 \leq b \leq 0.9$, $0 \leq c \leq 0.5$ and $0.001 \leq d \leq 0.1$); $Li_aNi_b$-$Co_cMn_dGeO_2$ ($0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$, or a combination thereof:

In the above chemical formulae, A is Ni, Co, Mn, or a combination thereof; R is Al, Ni, Co, Mn, Cr, Fe, Mg, Sr, V, a rare earth element, or a combination thereof; L is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu or combination thereof.

In some embodiments, the rechargeable lithium battery has excellent flame retardancy characteristics.

DETAILED DESCRIPTION

Exemplary embodiments of the present disclosure will hereinafter be described in detail. However, these embodiments are only exemplary, and this disclosure is not limited thereto.

According to one embodiment of the present disclosure, the non-aqueous electrolyte for a rechargeable lithium battery includes a non-aqueous organic solvent; a lithium salt; and a compound represented by the following Chemical Formula 1.

[Chemical Formula 1]

In some embodiments of a compound having the structure of Chemical Formula 1, $R_1$ and $R_2$ are each independently hydrogen, $C_1$ to $C_5$ alkyl group, or a C1 to C5 alkyl group substituted with one or more fluorines, provided that at least one of $R_1$ and $R_2$ is not hydrogen. For example, $R_1$ and $R_2$ can each independently be selected from the groups consisting of methyl, ethyl, —$CF_3$, —$CH_2CF_3$, —$CF_2CF_3$, and the like. In some embodiments, the compound represented by Chemical Formula 1 may be 4,5-dimethyl-2-[(2,2,3,3-tetrafluoropropyl)oxy]-1,3,2-dioxaphospholane 2-oxide. A compound with $R_1$ and $R_2$ both being hydrogen may exhibit the extreme high heat of the combustion, higher, e.g., 10 times or more than the compound with at least one of $R_1$ and $R_2$ being not hydrogen according to one embodiment of the present invention. Thus, a compound with $R_1$ and $R_2$ both being hydrogen has the deteriorated flame retardancy.

In some embodiments, a compound represented by the Chemical Formula 1 can act as a flame retardancy additive. The compound may markedly reduce the amount of exothermic heat from an electrode when added to an electrolyte solution in a trace amount. For example, the non-aqueous electrolyte may include the compound represented by the Chemical Formula 1 in an amount of about 0.1 to about 10 wt %. When the compound is used in a small amount within the range, it may bring about excellent flame retardancy effects.

In addition, a non-aqueous electrolyte including the compound represented by the Chemical Formula 1 may lower viscosity, markedly improve initial irreversible efficiency and improve cycle-life characteristics of a lithium rechargeable battery.

The non-aqueous organic solvent serves as a medium for transmitting ions taking part in the electrochemical reaction of a battery.

In some embodiments, the organic solvent may include a carbonate, ester, ether, ketone, or alcohol-moiety. In some embodiments, the organic solvent may an aprotic organic solvent. Examples of an organic solvent including a carbonate moiety include, but are not limited to, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of an organic solvent including an ester moiety include, but are not limited to, methyl acetate, ethyl acetate, n-propyl acetate, dimethyl acetate, methylpropionate, ethyipropionate, γ-butyrolactone, decanolide, valerolactone, mevalonolactone, caprolactone, and the like. Examples of an organic solvent including an ether moiety include, but are not limited to, dibutyl ether, tetraglyme, diglyme, dimethoxyethane, 2-methyltetrahydrofuran, tetrahydrofuran, and the like, and examples of the ketone-based solvent include cyclohexanone and the like. Examples of an organic solvent including an alcohol moiety include, but are not limited to, ethyl alcohol, isopropyl alcohol, and the like. Examples of an organicaprotic solvent include, but are not limited to, nitriles such as R—CN (where R is a C2 to C20 linear, branched, or cyclic hydrocarbon, a double bond, or an aromatic ring), amides such as dimethylformamide, dioxolanes such as 1,3-dioxolane, sulfolanes, and the like.

In some embodiments, the organic solvent may be used singularly or in a mixture. When the organic solvent is used in a mixture, the mixture ratio can be controlled in accordance with a desirable battery performance.

The organic solvent may include a mixture of a cyclic carbonate solvent and a linear carbonate solvent. In some embodiments, the cyclic carbonate and the linear carbonate can be mixed together in a volume ratio of about 1:1 to about 1:9. When the mixture is used as an electrolyte, the electrolyte performance may be enhanced.

In some embodiments, the non-aqueous organic electrolyte may further include an organic solvent including a mixture of a carbonate moiety containing solvent and an aromatic hydrocarbon component. In some embodiments, the carbonate moiety containing solvent and the aromatic hydrocarbon component may be mixed together in a volume ratio ranging from about 1:1 to about 30:1.

In some embodiments the aromatic hydrocarbon component may be represented by the following Chemical Formula 2.

[Chemical Formula 2]

In Chemical Formula 2, $R_1$ to $R_6$ are each independently hydrogen, a halogen, a $C_1$ to $C_{10}$ alkyl group, a $C_1$ to $C_{10}$ haloalkyl group, or a combination thereof.

The aromatic hydrocarbon component may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

In some embodiments, the non-aqueous electrolyte may further include vinylene carbonate, an ethylene carbonate-based compound of the following Chemical Formula 3, or a combination thereof in order to improve cycle-life of a battery.

[Chemical Formula 3]

In Chemical Formula 3, $R_7$ and $R_8$ are independently hydrogen, a halogen, a cyano group (CN), a nitro group ($NO_2$), or a $C_1$ to $C_5$ fluoroalkyl group, provided that at least one of $R_7$ and $R_8$ is a halogen, a cyano group (CN), a nitro group ($NO_2$), or a $C_1$ to $C_5$ fluoroalkyl group.

Examples of the ethylene carbonate-based compound include, but are not limited to, difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound included may be adjusted within an appropriate range.

In some embodiments, the lithium salt dissolved in an organic solvent can supply lithium ions in the battery, operate basic operation of a rechargeable lithium battery, and improve lithium ion transport between positive and negative electrodes. Examples of the lithium salt include, but are not limited to, at least one supporting salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$. In some embodiments, the lithium salt can be lithium bis(oxalate) borate (LiBOB). The lithium salt may be used in a concentration ranging from about 0.1 M to about 2.0 M. When the lithium salt is included at the above concentration range, electrolyte performance and lithium ion mobility may be enhanced due to optimal electrolyte conductivity and viscosity. In some embodiments, the lithium salt may be used in a concentration ranging from about 0.5 M to about 1.5 M. In some embodiments, the lithium salt is $LiPF_6$.

According to another embodiment of the present disclosure, a rechargeable lithium battery can include a negative electrode including a negative active material selected from a material that reversibly intercalates/deintercalates lithium ions, a lithium metal, a lithium metal alloy, a material being capable of doping and dedoping lithium, or a transition metal oxide; a positive electrode including a positive active material that reversibly intercalates/deintercalates lithium ions; and the non-aqueous electrolyte.

As described above, the non-aqueous electrolyte can include the non-aqueous organic solvent; lithium salt; and compound represented by the following Chemical Formula 1.

[Chemical Formula 1]

In the above Chemical Formula 1, $R_1$ and $R_2$ are each independently hydrogen, $C_1$ to $C_5$ alkyl group, or $C_1$ to $C_5$ alkyl group substituted with one or more fluorines, provided that at least one of $R_1$ and $R_2$ is not hydrogen. In some embodiments, $R_1$ and $R_2$ are each independently a $C_1$ to $C_3$ alkyl group. In some embodiments, $R_1$ is methyl. In some embodiments, the compound represented by Chemical Formula 1 is 4,5-dimethyl-2-[(2,2,3,3-tetrafluoropropyl)oxy]-1,3,2-dioxaphospholane 2-oxide.

In some embodiments, the rechargeable lithium battery has excellent flame retardant properties but still maintains excellent battery performances.

For example, the non-aqueous electrolyte may include a compound represented by Chemical Formula 1 in an amount of about 0.1 to about 10 wt %.

Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of shapes and sizes, and include cylindrical, prismatic, or coin-type batteries, and may be thin film batteries or may be rather bulky in size. Structures and fabricating methods for lithium ion batteries pertaining to the present invention are well known in the art.

Figure 1:
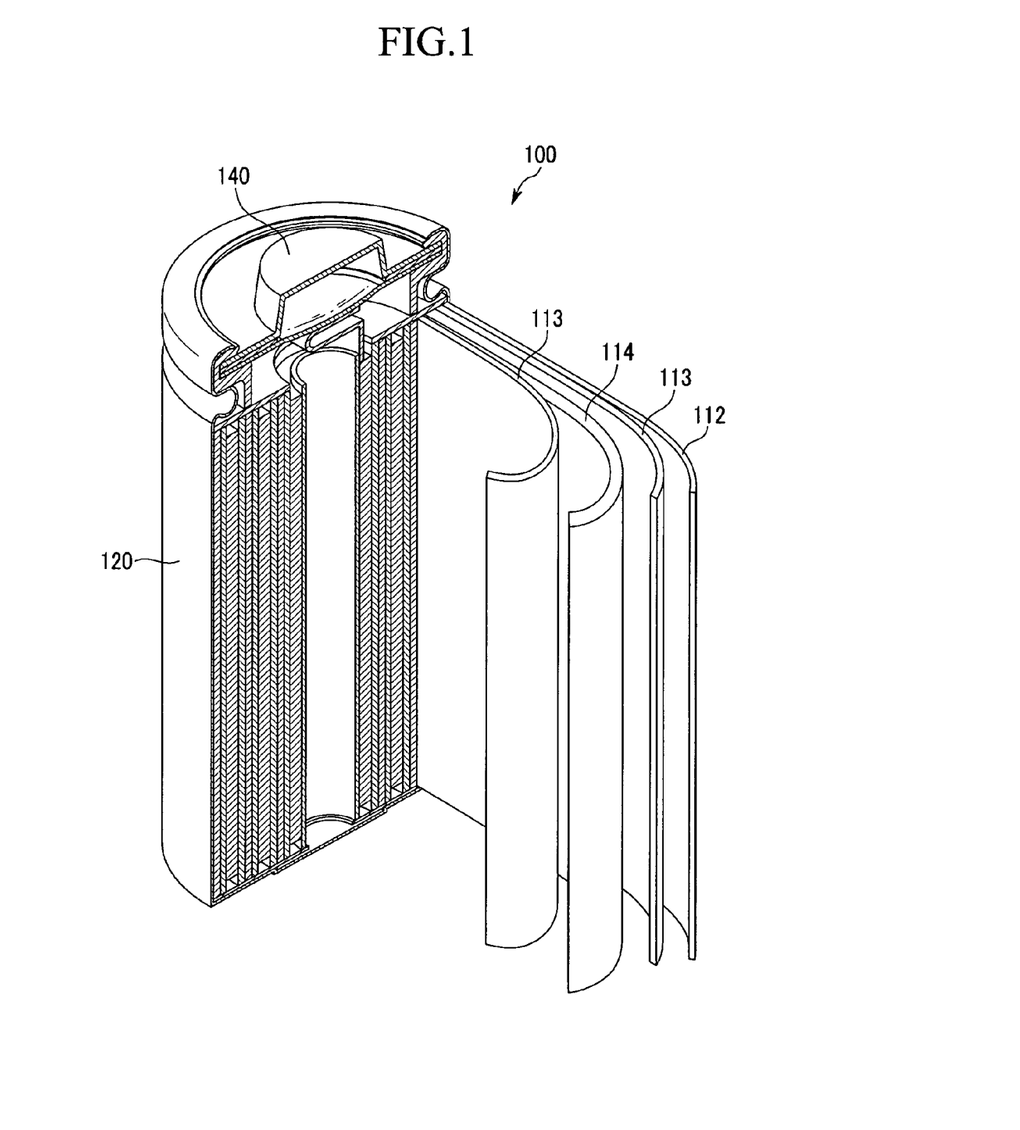
FIG. 1 is a schematic view of a rechargeable lithium battery according to one embodiment.

FIG. 1 is an exploded perspective view of a rechargeable lithium battery according to one embodiment. Referring to FIG. 1, the rechargeable lithium battery 100 is a cylindrical battery that includes a negative electrode 112, a positive electrode 114, a separator 113 interposed between the negative electrode 112 and the positive electrode 114, an electrolyte (not shown) impregnating the negative electrode 112, positive electrode 114, and separator 113, a battery case 120, and a sealing member 140 sealing the battery case 120. The negative electrode 112, positive electrode 114, and separator 113 are sequentially stacked, spirally wound, and placed in a battery case 120 to fabricate such a rechargeable lithium battery 100.

In some embodiments, the negative electrode 112 includes a current collector and a negative active material layer disposed on the current collector, and the negative active material layer includes a negative active material.

The negative active material includes a material that reversibly intercalates/deintercalates lithium ions, a lithium metal, a lithium metal alloy, a material being capable of doping lithium, or a transition metal oxide.

The material that reversibly intercalates/deintercalates lithium ions includes carbon materials. The carbon material may be any generally-used carbon-based negative active material in a lithium ion rechargeable battery. Examples of the carbon material include, but are not limited to, crystalline carbon, amorphous carbon, and a mixture thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, fired coke, and so on.

Examples of the lithium metal alloy include, but are not limited to, lithium and a metal of Na, K, Rb, Cs, Fr, Be, Mg, Ca, Sr, Si, Sb, Pb, In, Zn, Ba, Ra, Ge, Al or Sn.

Examples of the material being capable of doping lithium include, but are not limited to, Si, $SiO_x$ (0<x<2), a Si-Q alloy (where Q is an alkali metal, an alkali-earth metal, group 13 to 16 elements, or a combination thereof, and is not Si), Sn, $SnO_2$, a Sn—R alloy (where R is an alkali metal, an alkali-earth metal, group 13 to 16 elements, a transition element, a rare earth element, a transition element, a rare earth element, or a combination thereof and is not Sn), or mixtures thereof. At least one of these materials may be mixed with $SiO_2$. In some embodiments, the elements Q and R may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide include, but are not limited to, vanadium oxide, lithium vanadium oxide, and the like.

In some embodiments, the negative active material layer includes a binder, and optionally a conductive material.

In some embodiments, the binder improves binding properties of the negative active material particles to each other and to a current collector. The binder may include a non-water-soluble binder, a water-soluble binder, or a combination thereof. Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof. The water-soluble binder includes a styrene-butadiene rubber, an acrylated styrene-butadiene rubber, polyvinyl alcohol, sodium polyacrylate, a copolymer including propylene and a C2 to C8 olefin, a copolymer of (meth)acrylic acid and (meth) acrylic acid alkyl ester, or a combination thereof.

When the water-soluble binder is used as a negative electrode binder, a cellulose-based compound may be further used to provide viscosity.

The cellulose-based compound includes one or more of carboxylmethyl cellulose, hydroxypropylmethyl cellulose, methyl cellulose, or alkaline metal salts thereof. The alkali metal may be sodium (Na), potassium (K), or lithium (Li).

The cellulose-based compound may be included in an amount of 0.1 to 3 parts by weight based on 100 parts by weight of the negative active material.

In some embodiments, the conductive material is included to improve electrode conductivity. Any electrically conductive material may be used as a conductive material unless it causes a chemical change. Examples of the conductive material include a carbon-based material such as natural graphite, artificial graphite, carbon black, acetylene black, ketjen black, and a carbon fiber; a metal-based material such as a metal powder or a metal fiber including copper, nickel, aluminum, and silver; a conductive polymer such as a polyphenylene derivative; and a mixture thereof.

In some embodiments, the current collector includes a copper foil, a nickel foil, a stainless steel foil, a titanium foil, a nickel foam, a copper foam, a polymer substrate coated with a conductive metal, or combinations thereof.

In some embodiments, the positive electrode includes a current collector and a positive active material layer disposed on the current collector.

In some embodiments, the positive active material includes lithiated intercalation compounds that reversibly intercalate and deintercalate lithium ions. The positive active material may include a composite oxide including at least one selected from the group consisting of cobalt, manganese, and nickel, as well as lithium. In particular, the following compounds may be used:

$Li_aA_{1-b}R_bL_2$ (0.90≤a≤1.8 and 0≤b≤0.5); $Li_aE_{1-b}R_bO_{2-c}L_c$ (0.90≤a≤1.8, 0≤b≤0.5 and 0≤c≤0.05); $Li_aE_{2-b}R_bO_{4-c}L_c$ (0.90≤a≤1.8, 0≤b≤0.5, 0≤c≤0.05); $Li_aNi_{1-b-c}Co_bR_cL_\alpha$ (0.90≤a≤1.8, 0≤b≤0.5, 0≤c≤0.05 and 0<α≤2); $Li_aNi_{1-b-c}Co_bR_cO_{2-\alpha}Z_\alpha$ (0.90≤a≤1.8, 0≤b≤0.5, 0≤c≤0.05 and 0<α<2); $Li_aNi_{1-b-c}Co_bR_cO_{2-\alpha}Z_2$ (0.90≤a≤1.8, 0≤b≤0.5, 0≤c≤0.05 and 0<α<2); $Li_aNi_{1-b-c}Mn_bR_cL_\alpha$ (0.90≤a≤1.8, 0≤b≤0.5, 0≤c≤0.05 and 0<α≤2); $Li_aNi_{1-b-c}Mn_bR_cO_{2-\alpha}Z_\alpha$ (0.90≤a≤1.8, 0≤b≤0.5, 0≤c≤0.05 and 0<α<2); $Li_aNi_{1-b-c}Mn_bR_cO_{2-\alpha}Z_2$ (0.90≤a≤1.8, 0≤b≤0.5, 0≤c≤0.05 and 0<α<2); $Li_aNi_bE_cG_dO_2$ (0.90≤a≤1.8, 0≤b≤0.9, 0≤c≤0.5 and 0.001≤d≤0.1); $Li_aNi_bCo_cMn_dGeO_2$ (0.90≤a≤1.8, 0≤b≤0.9, 0≤c≤0.5, 0≤d≤0.5 and 0.001≤e≤0.1); $Li_aNiG_bO_2$ (0.90≤a≤1.8 and 0.001≤b≤0.1); $Li_aCoG_bO_2$ (0.90≤a≤1.8 and 0.001≤b≤0.1); $Li_aMnG_bO_2$ (0.90≤a≤1.8 and 0.001≤b≤0.1); $Li_aMn_2G_bO_4$ (0.90≤a≤1.8 and 0.001≤b≤0.1); $QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; L is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T si Cr, V, Fe, Sc, Y, or a combination thereof; and J is V, Cr, Mn, Co, Ni, Cu, or a combination thereof.

In some embodiments, the compound can have a coating layer on the surface, or may be mixed with a compound having a coating layer. In some embodiments, the coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. In some embodiments, the compounds for a coating layer may be amorphous or crystalline. In some embodiments, the coating element for a coating layer may include Mg, Al, Co, K, Na, Ca, Si, Ti, V, Sn, Ge, Ga, B, As, Zr, or a mixture thereof. In some embodiments, the coating layer can be formed in a method having no negative influence on properties of a positive active material by including these elements in the compound. For example, the method may include any coating method such as spray coating, dipping, and the like, but is not illustrated in more detail, since it is well-known to those who work in the related field.

In some embodiments, the positive active material layer may also include a binder and a conductive material.

In some embodiments, the binder improves binding properties of the positive active material particles to each other and to a current collector. Examples of the binder include at least one component selected from the group consisting of polyvinyl alcohol, carboxylmethyl cellulose, hydroxypropyl cellulose, diacetyl cellulose, polyvinylchloride, carboxylated polyvinyl chloride, polyvinylfluoride, polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

Any electrically conductive material may be used as a conductive material unless it causes a chemical change. Examples of the conductive material include, but are not limited to, natural graphite, artificial graphite, carbon black, acetylene black, ketjen black, a carbon fiber, a metal powder or a metal fiber including copper, nickel, aluminum, silver, and so on, and a polyphenylene derivative.

The current collector may be Al, but is not limited thereto.

In some embodiments, the negative and positive electrodes may be fabricated in a method including mixing the active material, a binder, and optionally, a conductive material to provide an active material composition, and coating the composition on a current collector. The solvent includes N-methylpyrrolidone and the like, but is not limited thereto.

In some embodiments, the rechargeable lithium battery may further include a separator between the negative electrode and the positive electrode, as needed. Examples of suitable separator materials include polyethylene, polypropylene, polyvinylidene fluoride, and multi-layers thereof, such as a polyethylene/polypropylene double-layered separator, a polyethylene/polypropylene/polyethylene triple-layered separator, and a polypropylene/polyethylene/polypropylene triple-layered separator.

Hereinafter, examples of one or more embodiments will be described in detail including comparative examples. However, these examples are not intended to limit the scope of the one or more embodiments.

EXAMPLES

Preparation Example 1

4,5-dimethyl-2-[(2,2,3,3-tetrafluoropropyl)oxy]-1,3,2-dioxaphospholane 2-oxide 2,3-butanediol and 2,2,3,3-tetrafluoropropyl dichlorophosphate were reacted under pyridine according to the following reaction scheme 1, preparing 4,5-dimethyl-2-[(2,2,3,3-tetrafluoropropyl)oxy]-1,3,2-dioxaphospholane 2-oxide with a yield of 68%.

[Reaction Scheme 1]

2,2,3,3-tetrafluoropropyl dichlorophosphate (15.94 g, 0.064 mol) was added to diethylether (150 mL) to prepare a solution. Another solution was prepared by adding 2,3-butanediol (5.77 g, 0.064 mol) and pyridine (10.13 g, 0.128 mol) to diethylether (15 mL). The latter solution was vigorously agitated and added to the former solution in a dropwise fashion at a temperature ranging from about −10° C. to about −5° C. for 2 hours. During the addition, a white pyridine hydrochloride precipitate formed. The resulting mixture was additionally agitated at a room temperature for 3 hours and then, allowed to stand overnight. The pyridine hydrochloride precipitate was filtrated to remove, and the resulting was washed with diethylether. Then, the solvent (diethylether) therein was removed under atmospheric pressure, and the residue was distilled under vacuum, giving 11.59 g of 4,5-dimethyl-2-[(2,2,3,3-tetrafluoropropyl)oxy]-1,3,2-dioxaphospholane 2-oxide (yield: 68%). The product had three stereo-isomer (a ratio of major:medium:minor=4:2:1 according to $^1$H and $^{31}$P NMR), and physical properties of b.p. of 117° C. (1 mm Hg), and d420 1.4517, nD20 1.3910. The product was a transparent and colorless solution.

$^1$H NMR (CDCl$_3$, d, ppm): 1.28 d (6H, 2CH$_3$ of a first isomer (minor isomer), 3JHH 6.1 Hz); 1.32 d (6H, 2CH$_3$ of a second isomer (medium isomer), 3JHH 6.1 Hz); 1.34 d (3H, CH$_3$ of a third isomer (major isomer), 3JHH 6.1 Hz); 1.37 d (3H, CH$_3$ of a third isomer, 3JHH 6.1 Hz); 4.21 m (1H, CH of the third isomer); 4.29 m (1H, CH of a third isomer); 4.38 td (2H, CH2 of a third isomer, 2H, CH$_2$ of a the second isomer and 2H of a first isomer, 2CH2, 3JHF 11.2 Hz, 3JHP 10.8 Hz); 4.67 m (2H, 2CH of a second isomer); 4.76 m (2H, 2CH of a first isomer); 5.87 tt (1H, CHF$_2$ of a third isomer, 1JHF 52.9 Hz, 3JHF 3.9 Hz); 5.85 tt (1H of a second isomer, CHF$_2$).

$^{13}$C NMR (d, ppm): 14.95 d (2CH$_3$ for minor isomer, 3JCP 5.1 Hz); 15.28 d (2CH$_3$ of a second isomer (medium)); 17.75 d (CH$_3$ of a third isomer (major), 3JC-P 8.8 Hz); 17.88 d (CH$_3$ of a third isomer, 3JC-P 7.7 Hz); 63.38 td (CH$_2$ of a second isomer, 2JCF 30.1 Hz, 2JCP 5.0 Hz); 63.43 td (CH$_2$ of a third isomer, 2JCF 29.7 Hz, 2JCP 4.8 Hz); 78.43 d (2CH of a second isomer, 2JCP 1.5 Hz); 78.72 d (2CH of a first isomer, 2JCP 2.2 Hz); 81.74 d (CH of a third isomer, 2JCP 1.8 Hz); 82.06 d (CH of a third isomer, 2JCP 1.8 Hz); 108.94 tt (CF$_2$H of a second isomer, 1JCF 249.8 Hz, 2JCF 35.2 Hz); 108.96 tt (CF$_2$H of a third isomer, 1JCF 250.2 Hz, 2JCF 35.6 Hz); 109.00 tt (CF$_2$H of a first isomer, 1JCF 250.5 Hz, 2JCF 36.0 Hz); 113.55 (CF$_2$CF$_2$H of a second isomer); 113.63 (CF$_2$CF$_2$H of a third isomer).

$^{19}$F NMR (CDCl$_3$, d, ppm): −138.03 d (CHF$_2$ of a first isomer, 2JHF 53.7 Hz); −137.89 d (CHF$_2$ of a third isomer, 2JHF 53.7 Hz); −137.66 d (CHF$_2$ of a second isomer, 2JHF 54.6 Hz); −125.09 m (CF$_2$ of a first isomer); −125.22 m (CF$_2$ of a third isomer); −125.09 m (CF$_2$ of a second isomer).

$^{31}$P NMR (CDCl$_3$, d, ppm): 31P NMR (CDCl$_3$, d, ppm): a third isomer 14.89 s, the second isomer 15.28 s and a first isomer 16.61 s.

IR (film, cm$^{-1}$): 2991 s, 2942 m, 2852 w, 1461 m, 1447 m, 1390 s, 1339 w, 1291 s, 1261 m, 1238 m, 1212 w, 1106 s, 1043 s, 998 m, 965 s, 914 m, 881 m, 839 s, 778 w, 754 w, 735 w, 678 m, 647 w, 610 m, 580 m, 547 m, 506 w, 487 m, 448 w.

Found, %: C, 31.82; H, 4.38; F, 28.28; P, 11.38. C7H11F4O4P. Calcd, %: C, 31.59; H, 4.17; F, 28.56; P, 11.64.

Figure 7:
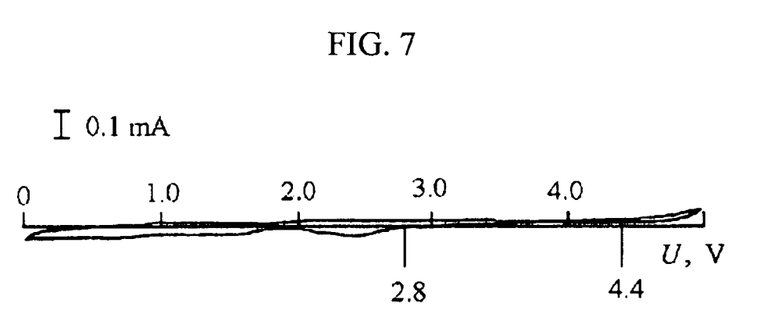
FIG. 7 is a graph of the electrochemical stability window of 4,5-dimethyl-2-[(2,2,3,3-tetrafluoropropyl)oxy]-1,3,2-dioxaphospholane 2-oxide according to Preparation Example 1.

FIG. 7 shows the electrochemical stability window of 4,5-dimethyl-2-[(2,2,3,3-tetrafluoropropyl)oxy]-1,3,2-dioxaphospholane 2-oxide according to Preparation Example 1.

A reduction peak (anodic peak) started at 2.8V or less, and an oxidation peak (cathodic peak) started from 4.4V. A potential region ranging from 2.8 to 4.2V displayed no electrochemical oxidation and displayed no reduction decomposition.

Preparation of an Electrolyte

Example 1

LiPF$_6$ was added to have 1M of a concentration to ethylene carbonate (EC)/ethylmethyl carbonate (EMC) (a volume % of 3/7), and 4,5-dimethyl-2-[(2,2,3,3-tetrafluoropropyl)oxy]-1,3,2-dioxapholane 2-oxide as a flame retardant was added thereto to be 10 volume % to prepare an electrolyte based on 100% volume of EC, EMC and the flame retardant.

Comparative Example 1

An electrolyte was prepared according to the same method as Example 1 except for not including the flame retardant of Preparation Example 1.

Comparative Example 2

An electrolyte was prepared according to the same method as Example 1 except for including a compound represented by the following Chemical Formula 4 instead of the flame retardant of Preparation Example 1.

[Chemical Formula 4]

Comparative Example 3

An electrolyte was prepared according to the same method as Example 1 including a compound represented by the following Chemical Formula 5 instead of the flame retardant of Preparation Example 1.

[Chemical Formula 5]

Comparative Example 4

An electrolyte was prepared according to the same method as Example 1 except for including a compound represented by following Chemical Formula 6 instead of the flame retardant of Preparation Example 1.

[Chemical Formula 6]

Comparative Example 5

An electrolyte was prepared according to the same method as Example 1 except for including a compound represented by following Chemical Formula 7 instead of the flame retardant of Preparation Example 1.

[Chemical Formula 7]

Fabrication of a Rechargeable Lithium Battery Cell

Positive electrode: 90 wt % of LiMn$_2$O$_4$ (Mitsui type G), 5 wt % of Super-P (Tradename: KF1300, a carbon conductive agent), 5 wt % of Polyvinylidene fluoride (PVdF, a binder, DuPont Co., Wilmington, Del., USA)

Negative electrode: 97.5 wt % of MSG (Mitsubishi Chemical Co., Chiyoda-ku, Tokyo, Japan), 1.5 wt % SBR of (a styrene-butadiene rubber binder), 1 wt % of CMC (a cellulose binder)

Separator: ND525 (Asahi-kasei, Tokyo, Japan), PE, 25 um

The negative electrode, the positive electrode, and the separator were wound and compressed and then, housed in a coin-type battery case (a 2032 cell; a coin full cell), and each electrolyte according to Example 1 and Comparative Examples 1 to 5 were respectively implanted thereto, fabricating lithium ion battery cells according to Example 1 and Comparative Examples 1 to 5.

Experimental Example 1

Amount of Exothermic Heat

Figure 2:
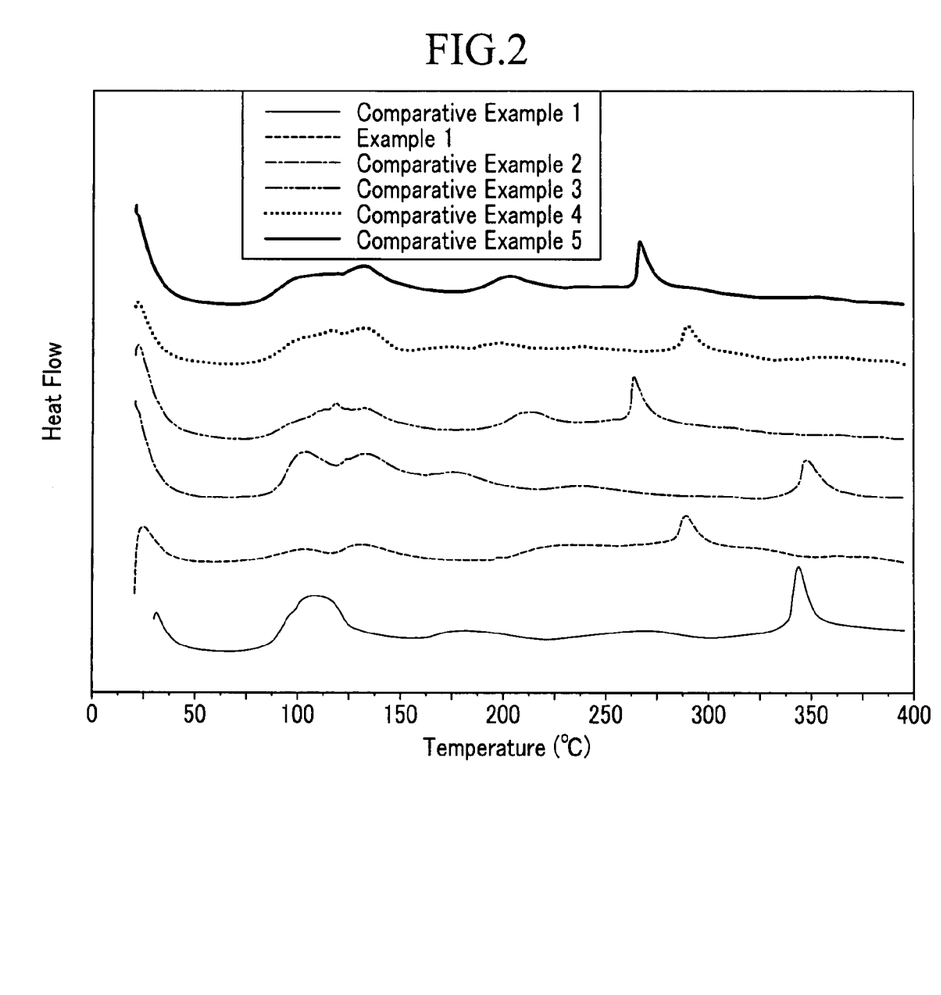
FIG. 2 is a graph showing the amount of exothermic heat of the negative electrodes of the rechargeable lithium battery cells according to Examples and Comparative Examples.

For, the lithium ion battery cells according to Example 1 and Comparative Examples 1 to 5, the DSC samples were prepared by scratching off 1.5 mg of lithiated negative active mass powder, placing them in DSC pans, dropping 0.45 mg of electrolytes with a syringe on the active mass powder, and sealing the DSC pans. The heat flow were measured for each DSC samples being heated at an increasing rate of 10° C./min using a differential scanning calorimeter (DSC) (DSC 2900, TA Instrument, New Castle, Del., USA). FIG. 2 shows the heat flow for each DSC samples. Furthermore, the amounts of exothermic heat were measured from FIG. 2.

An exotherm onset temperature and an exothermic peak area, i.e., total amount of exothermic heat for each DSC sample for each negative electrode are summarized in Table 1. Example 1 shows an exotherm onset temperature of 99° C. and relatively higher exothermic temperature and thus, relatively smaller total amount of exothermic heat.

TABLE 1

|  | Exotherm onset temperature (° C.) | Total amount of exothermic heat (J/g) |
|---|---|---|
| Example 1 | 99 | 688 |
| Comparative Example 1 | 84 | 852 |
| Comparative Example 2 | 88 | 873 |
| Comparative Example 3 | 81 | 888 |
| Comparative Example 4 | 81 | 879 |
| Comparative Example 5 | 81 | 941 |

Figure 3:
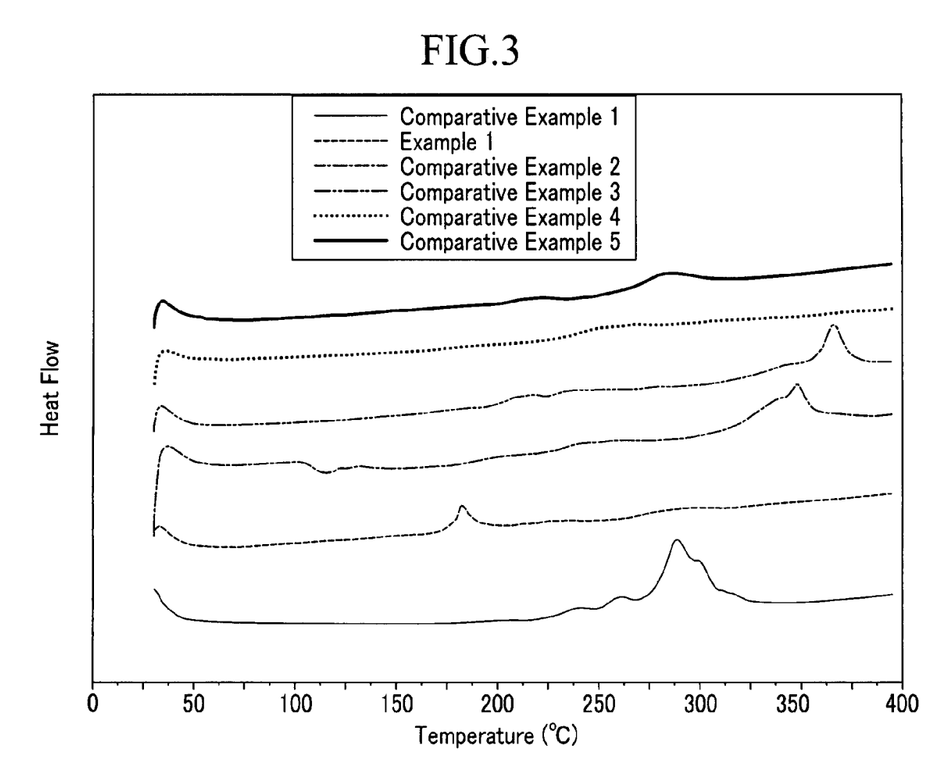
FIG. 3 is a graph showing the amount of exothermic heat of the negative electrodes of the rechargeable lithium battery cells according to Examples and Comparative Examples.

The amounts of exothermic heat of positive electrodes were measured according to the same method as in the aforementioned method and the results are showed in FIG. 3. That is, the DSC samples for the positive electrodes were prepared from the delithiated positive active mass powder prepared as the same method as for the DSC samples for Table 1 using a differential scanning calorimeter (DSC) (DSC 2900, TA Instrument).

An exotherm onset temperature and an exothermic peak area, i.e., total amount of exothermic heat for each DSC sample for each positive electrode are summarized in Table 2.

TABLE 2

|  | Exotherm starting temperature (° C.) | Total amount of exothermic heat (J/g) |
|---|---|---|
| Example 1 | 112 | 178 |
| Comparative Example 1 | 167 | 824 |
| Comparative Example 2 | 156 | 461 |
| Comparative Example 3 | 158 | 352 |
| Comparative Example 4 | 163 | 203 |
| Comparative Example 5 | 202 | 186 |

Experimental Example 2

Figure 4:
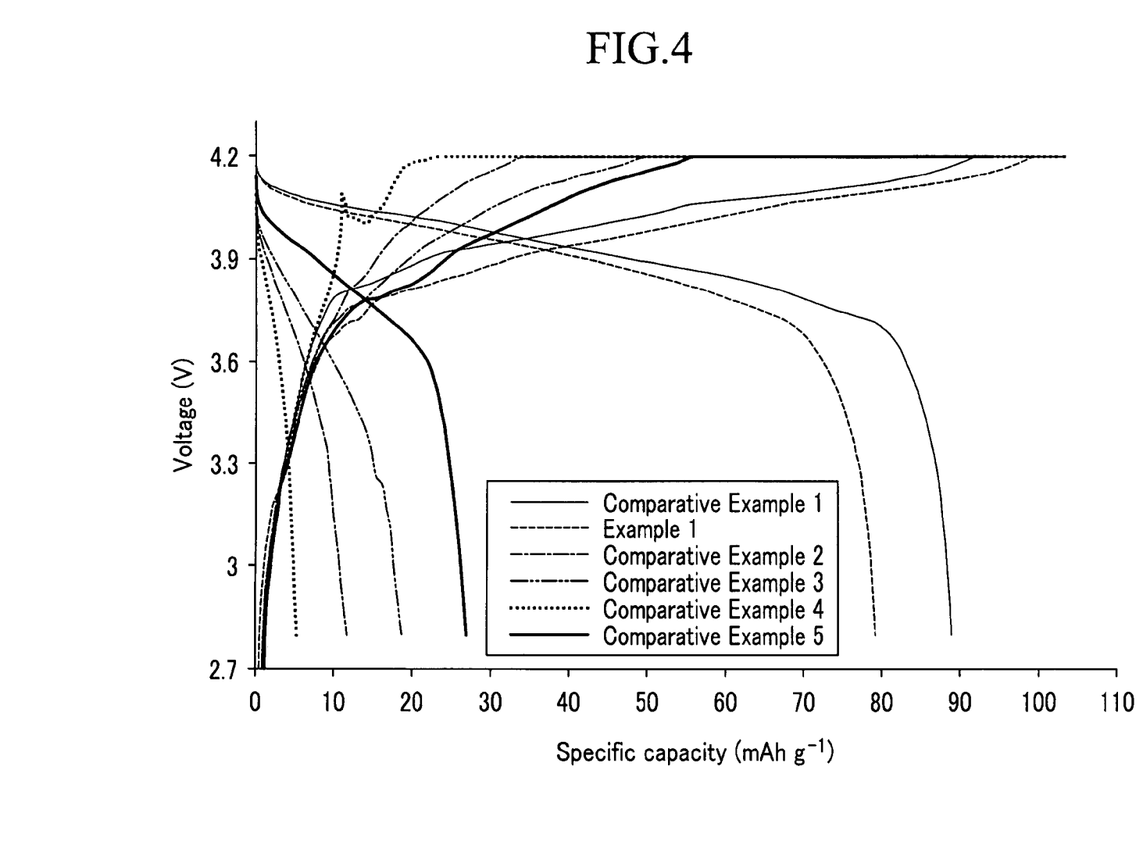
FIG. 4 is a graph showing charge and discharge characteristics of the rechargeable lithium battery cells according to Examples and Comparative Examples.
Figure 5:
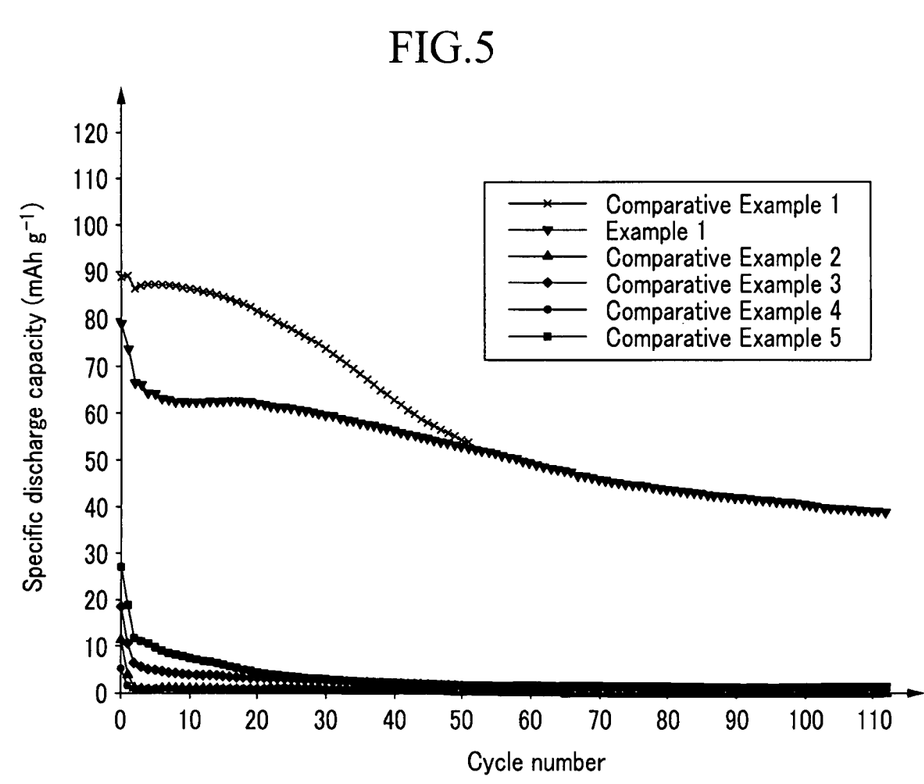
FIG. 5 is a graph showing cycle-life characteristics of the rechargeable lithium battery cells according to Examples and Comparative Examples.
Figure 6:
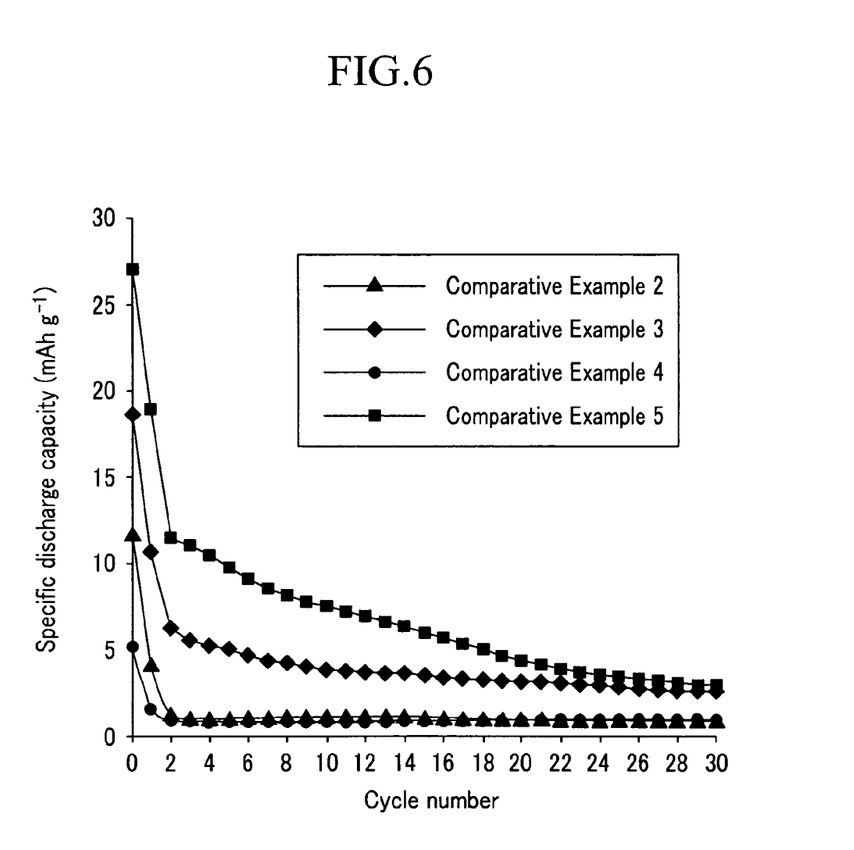
FIG. 6 is a graph enlarging cycle-life of the rechargeable lithium battery cells according to Examples and Comparative Examples in FIG. 5.

Evaluation of Charge and Discharge Characteristic and Cycle-Life Characteristics Each lithium ion battery cell according to Example 1 and Comparative Examples 1 to 5 was evaluated regarding charge and discharge characteristic. The charge and discharge curved lines are provided in FIG. 4. From the charge and discharge curved lines, discharge capacity, charge capacity, and irreversible efficiency of charge and discharge of each lithium ion battery cell were measured and provided in the following Table 3. FIG. 5 provides the cycle-life characteristics at 1C of each lithium ion battery cell. FIG. 6 shows a graph enlarging the results of the rechargeable lithium battery cells of Comparative Examples 2 to 5 provided in FIG. 5.

The rechargeable lithium battery cells were charged at 0.1C, to 4.2V of a charge potential (1/50 cut-off), and then discharged to 3.0V of a discharge potential at the first cycle. Then, the rechargeable lithium battery cells were charged were charged at 0.2C, to 4.2V of a charge potential (1/20 cut-off), and discharged to 3.0V of a discharge potential at the second cycle. Then, the rechargeable lithium battery cells were charged at 0.5C, to 4.2V of a charge potential (1/20 cut-off), and then discharged to 3.0V of a discharge potential after the third cycle.

TABLE 3

|  | Discharge capacity (mAh/g) | Charge capacity (mAh/g) | Irreversible capacity (%) |
|---|---|---|---|
| Example 1 | 79 | 103 | 23 |
| Comparative Example 1 | 89 | 101 | 12 |
| Comparative Example 2 | 12 | 92 | 87 |
| Comparative Example 3 | 19 | 99 | 81 |
| Comparative Example 4 | 5 | 88 | 94 |
| Comparative Example 5 | 27 | 94 | 71 |

The cell of Example 1 had bigger irreversible capacity than the cell of Comparative Example 1 but relatively smaller irreversible capacity than the cells of Comparative Examples 2 to 5. The cell of Example 1 had favorable capacity retention other than initial capacity in the cycle-life data of FIGS. 5 and 6.

While the present embodiments have been described in connection with what is presently considered to be practical exemplary embodiments, it is to be understood that the invention is not limited to the disclosed embodiments and is intended to cover various modifications and equivalent arrangements included within the spirit and scope of the appended claims.

What is claimed is:

1. A non-aqueous electrolyte for a rechargeable lithium battery, comprising:
   an organic solvent;
   a lithium salt; and
   a compound represented by the following Chemical Formula 1:

[Chemical Formula 1]

wherein, $R_1$ and $R_2$ are each independently hydrogen, $C_1$ to $C_5$ alkyl group, or a $C_1$ to $C_5$ alkyl group substituted with one or more fluorines, provided that at least one of $R_1$ and $R_2$ is not hydrogen, and
   wherein the compound represented by Chemical Formula 1 is included in an amount of 0.1 to 10 wt %.

2. The non-aqueous electrolyte for a rechargeable lithium battery of claim 1, wherein the organic solvent comprises a carbonate moiety, ester moiety, ether moiety, ketone moiety, or alcohol moiety.

3. The non-aqueous electrolyte for a rechargeable lithium battery of claim 1, wherein the organic solvent comprises an aprotic solvent.

4. The non-aqueous electrolyte for a rechargeable lithium battery of claim 1, wherein the lithium salt comprises at least one of $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, $LiB(C_2O_4)_2$ (lithium bisoxalato borate), or a combination thereof.

5. The non-aqueous electrolyte for a rechargeable lithium battery of claim 1, wherein the lithium salt is $LiPF_6$.

6. The non-aqueous electrolyte for a rechargeable lithium battery of claim 1, wherein the lithium salt is used at a concentration ranging from about 0.1 M to about 2.0 M.

7. The non-aqueous electrolyte for a rechargeable lithium battery of claim 1, wherein the lithium salt is used at a concentration ranging from about 0.5 M to about 1.5 M.

8. The non-aqueous electrolyte for a rechargeable lithium battery of claim 1, wherein the lithium salt is about 1.0 M.

9. The non-aqueous electrolyte for a rechargeable lithium battery of claim 1, wherein $R_1$ and $R_2$ are each independently a $C_1$ to $C_3$ alkyl group.

10. The non-aqueous electrolyte for a rechargeable lithium battery of claim 1, wherein $R_1$ is methyl.

11. The non-aqueous electrolyte for a rechargeable lithium battery of claim 1, wherein the compound is 4,5-dimethyl-2-[(2,2,3,3-tetrafluoropropyl)oxy]-1,3,2-dioxaphospholane 2-oxide.

12. The non-aqueous electrolyte for a rechargeable lithium battery of claim 1, wherein the organic solvent comprises ethylene carbonate.

13. The non-aqueous electrolyte for a rechargeable lithium battery of claim 1, wherein the organic solvent comprises ethylmethyl carbonate.

14. The non-aqueous electrolyte for a rechargeable lithium battery of claim 1, wherein the organic solvent is a mixture of ethylene carbonate and ethylmethyl carbonate.

15. A rechargeable lithium battery, comprising:
a negative electrode including a negative active material selected from a material that reversibly intercalates/deintercalates lithium ions, a lithium metal, a lithium metal alloy, a material being capable of doping and dedoping lithium, or a transition metal oxide;
a positive electrode including a positive active material that reversibly intercalates/deintercalates lithium ions; and
the non-aqueous electrolyte of claim 1.

16. The rechargeable lithium battery of claim 15, wherein the positive active material is $Li_aA_{1-b}R_bL_2$ ($0.90 \leq a \leq 1.8$ and $0 \leq b \leq 0.5$); $Li_aE_{1-b}R_bO_{2-c}L_c$ ($0.90 \leq a \leq 1.8$, $0 \leq b \leq 0.5$ and $0 \leq c \leq 0.05$); $Li_aE_{2-b}R_bO_{4-c}L_c$ ($0.90 \leq a \leq 1.8$, $0 \leq b \leq 0.5$, $0 \leq c \leq 0.05$); $Li_aNi_{1-b-c}Co_bR_cL_\alpha$ ($0.90 \leq a \leq 1.8$, $0 \leq b \leq 0.5$, $0 \leq c \leq 0.05$ and $0 \leq \alpha \leq 2$); $Li_aNi_{1-b-c}CO_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ ($0.90 \leq a \leq 1.8$, $0 \leq b \leq 0.5$, $0 \leq c \leq 0.05$ and $0 \leq \alpha \leq 2$); $Li_aNi_{1-b-c}Mn_bR_cL_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_bE_cG_dO_2$ ($0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ ($0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$ or a combination thereof:
wherein in the above formulae, A is Ni, Co, Mn, or a combination thereof; R is Al, Ni, Co, Mn, Cr, Fe, Mg, Sr, V, a rare earth element, or a combination thereof; L is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu or combination thereof.

17. The rechargeable lithium battery of claim 15, wherein the compound is 4,5-dimethyl-2-[(2,2,3,3-tetrafluoropropyl)oxy]-1,3,2-dioxaphospholane 2-oxide.

18. The rechargeable lithium battery of claim 15, wherein the lithium salt is $LiPF_6$.

* * * * *